US009013483B2

(12) United States Patent
Takemoto et al.

(10) Patent No.: US 9,013,483 B2
(45) Date of Patent: Apr. 21, 2015

(54) IMAGE PROCESSING APPARATUS AND IMAGE PROCESSING METHOD

(75) Inventors: Kazuki Takemoto, Kawasaki (JP); Takashi Aso, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1348 days.

(21) Appl. No.: 12/248,473

(22) Filed: Oct. 9, 2008

(65) Prior Publication Data
US 2009/0102845 A1 Apr. 23, 2009

(30) Foreign Application Priority Data
Oct. 19, 2007 (JP) ................................. 2007-273093

(51) Int. Cl.
*G06T 7/00* (2006.01)
*G06T 19/00* (2011.01)

(52) U.S. Cl.
CPC ....... *G06T 7/004* (2013.01); *G06T 2207/10021* (2013.01); *G06T 19/006* (2013.01)

(58) Field of Classification Search
CPC ............ G06T 19/20; G06T 2219/2004; G06T 19/006
USPC .................................................. 345/632, 633
See application file for complete search history.

(56) References Cited

U.S. PATENT DOCUMENTS

| 5,243,668 | A | * | 9/1993 | Kitamura et al. | ............. | 382/256 |
| 6,700,588 | B1 | * | 3/2004 | MacInnis et al. | ............. | 345/629 |
| 6,972,734 | B1 | | 12/2005 | Ohshima et al. | | |
| 7,027,659 | B1 | * | 4/2006 | Thomas | ........................ | 382/254 |
| 7,056,216 | B2 | | 6/2006 | Ohshima | | |
| 7,574,070 | B2 | * | 8/2009 | Tanimura et al. | ............. | 382/284 |
| 2003/0185461 | A1 | * | 10/2003 | Ohshima | ....................... | 382/284 |
| 2005/0068316 | A1 | * | 3/2005 | Endo et al. | ..................... | 345/419 |
| 2005/0069223 | A1 | * | 3/2005 | Tanimura et al. | ............. | 382/284 |
| 2005/0215879 | A1 | * | 9/2005 | Chuanggui | ................... | 600/407 |
| 2005/0231532 | A1 | * | 10/2005 | Suzuki et al. | .................. | 345/633 |
| 2007/0132785 | A1 | * | 6/2007 | Ebersole et al. | .............. | 345/633 |

(Continued)

FOREIGN PATENT DOCUMENTS

| JP | 2000-353248 A | 12/2000 |
| JP | 2007-108834 A | 4/2007 |
| WO | 03/063086 A1 | 7/2003 |

OTHER PUBLICATIONS

A Mixed Reality System with Visual and Tangible Interaction Capability, Ohshima et al., 2004.*

(Continued)

*Primary Examiner* — David Zarka
*Assistant Examiner* — Phong Nguyen
(74) *Attorney, Agent, or Firm* — Cowan, Liebowitz & Latman, P.C.

(57) ABSTRACT

An object region detection unit (130) decides the region of a physical object of interest in a physical space image. An image manipulation unit (140) performs shading processing of an inclusion region including the decided region. A rendering unit (155) arranges a virtual object in virtual space at the position and orientation of the physical object of interest and generates a virtual space image based on the position and orientation of the user's viewpoint. A composition unit (160) generates a composite image by superimposing the virtual space image on the physical space image that has undergone the shading processing and outputs the generated composite image to an HMD (190).

17 Claims, 11 Drawing Sheets

(56) References Cited

U.S. PATENT DOCUMENTS

2007/0146391 A1* 6/2007 Pentenrieder et al. ........ 345/633
2007/0279415 A1* 12/2007 Sullivan et al. ............... 345/427

OTHER PUBLICATIONS

Occlusion in Collaborative Augmented Environments, Fuhrmann et al., 1999.*

"Mixed Reality: A New World Seen at the Boarder between Real and Virtual Worlds" In Information Processing Society of Japan vol. 43, No. 3, 2002. Hiroyuki Yamamoto, pp. 213-216. Japanese document and Full English translation.

"A Hybrid and Linear Registration Method Utilizing Inclination Constraint" In Mixed and Augmented Reality, Oct. 2005. Daisuke Kotake, et al. pp. 140-149 (English Document).

"A Mixed Reality System with Visual and Tangible Interaction Capability—Application to Evaluating Automobile Interior Design—" In transactions of the Virtual Reality Society of Japan, vol. 9, No. 1, 2004. Toshikazu Ohshima, et al. pp. 79-88. Japanese document and Full English translation.

Nov. 21, 2011 Japanese Office Action, which is enclosed without an English Translation, that issued in Japanese Patent Application No. 2007-273093.

* cited by examiner

F I G. 14
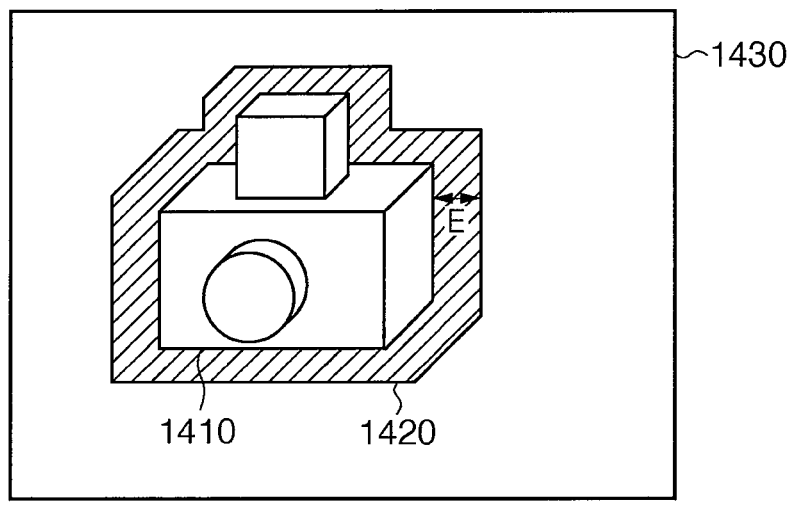

IMAGE PROCESSING APPARATUS AND IMAGE PROCESSING METHOD

BACKGROUND OF THE INVENTION

1. Field of the Invention

The present invention relates to a technique of providing mixed reality.

2. Description of the Related Art

There is an MR (Mixed Reality) presentation apparatus which forms the image of an object (virtual object) by three-dimensional modeling, and superimposes the virtual object image on the image of physical space as if the CG object were present in the physical space (non-patent reference 1).

This apparatus includes the following units.

A physical image sensing unit (e.g., video camera) which senses the image of the physical space A CG image generation unit which generates a CG image viewed from the physical space image sensing position An image display unit (e.g., HMD (Head Mounted Display) or monitor) which composites the physical space image with the CG image and displays the composite image The apparatus also includes a line-of-sight position and orientation detection unit (e.g., position and orientation sensor) which detects the line-of-sight position and direction of the physical image sensing unit to accurately display the positional relationship between the CG image and the physical space image even when the line-of-sight position and orientation of the physical image sensing unit has changed.

The CG image generation unit places the virtual object formed by three-dimensional modeling in virtual space having the same scale as the physical space, and renders the virtual space observed from the line-of-sight position and direction detected by the line-of-sight position and orientation detection unit. The thus generated CG image is composited with the physical space image sensed by the physical image sensing unit. It is consequently possible to display an image as if the virtual object existed in the physical space independently of the line-of-sight position and direction.

Changing the type or layout of the virtual object or its animation can freely be done by the same method as general CG. The position of the virtual object may be designated using an additional position and orientation sensor so that the virtual object is arranged at a position and orientation corresponding to the measured value of the position and orientation sensor.

The conventional arrangement also allows the user to hold the position and orientation sensor in hand and observe the virtual object arranged at a position and orientation indicated by the measured value of the position and orientation sensor.

The physical image sensing unit that senses the physical space image is, for example, a video camera which senses an image in its line-of-sight direction and captures the image in a memory.

As an image display device which composites the physical space image with the CG image and displays the composite image, for example, an HMD is used. When the HMD is used in place of a normal monitor, and the video camera is attached to the HMD while being directed in its line-of-sight direction, an image in the observer's looking direction can be displayed on the HMD. Since a CG corresponding to the observer's looking direction can be rendered, the observer can experience a world closer to the reality.

The image display unit of the mixed reality presentation apparatus displays, on the image display device, an image (MR image) obtained by compositing the physical space image with the CG image.

As the line-of-sight position and orientation detection unit, a magnetic position and orientation sensor or the like is used. The position and orientation sensor is attached to the video camera (or the HMD with the video camera), thereby detecting the position and orientation of the video camera. The magnetic position and orientation sensor detects the relative position and orientation between a magnetic field generator (transmitter) and a magnetic sensor (receiver). It detects the three-dimensional position (X, Y, Z) and orientation (Roll, Pitch, Yaw) of the sensor in real time.

The above-described arrangement enables the observer to observe the composite image of the physical space image and the CG image via the image display unit such as the HMD. If the observer looks around, the video camera attached to the HMD senses the physical space image, and the position and orientation sensor attached to the HMD detects the line-of-sight position and direction of the video camera. Accordingly, the CG image generation unit generates (renders) a CG image viewed from the line-of-sight position and orientation, composites it with the physical space image, and displays the composite image.

The mixed reality presentation apparatus can superimpose a virtual object on a physical object. In, for example, a game disclosed in patent reference 1, a virtual object of a sword or weapon is superimposed on an interactive operation input device held by a user, thereby allowing him/her to freely manipulate the virtual object (in this case, the sword or weapon). In non-patent reference 2, a virtual object generated by CAD is superimposed on a mock-up 1310 of a camera as shown in FIG. 5, thereby implementing a virtual scale model that can actually be taken in hand.

The conventional mixed reality presentation method only superimposes and composites a CG image on the physical space image. The depth relationship between the physical object and the virtual object is not necessarily taken into consideration. For this reason, when the observer puts a hand of his/her own in front of a virtual object, the hand is invisible, and the virtual object that should be behind the hand is displayed on the near side.

FIG. 2A is a view showing an observer who wears an HMD on the head, and a virtual object observed by the observer. Referring to FIG. 2A, an observer 200 wears an HMD 201 on his/her head and observes a virtual object 202 while putting his/her hand 203 in the field of vision.

FIG. 2B is a view showing an example of an image displayed on the HMD 201 when the observer 200 observes the virtual object 202 while putting the hand 203 in the field of vision. As shown in FIG. 2B, an image 204 is displayed on the HMD 201. The image 204 includes the hand 203. The virtual object 202 hides the hand 203. In FIG. 2B, the hidden hand 203 is indicated by a dotted line.

The hand 203 should be rendered in front of the virtual object 202 in consideration of the depth relationship between the virtual object 202 and the hand 203. However, since the CG image is superimposed on the physical space image, the virtual object 202 is rendered in the region where the hand 203 should be rendered.

The depth relationship between the virtual object and the physical object can correctly be displayed by measuring the depth information of the physical object in real time. However, a device to be used to measure the depth information of a physical object in real time is bulky and expensive. In addition, if the resolution of depth information is insufficient, the outline of overlap between the virtual object and the physical object may be inaccurate.

If a physical object is expected to have a specific color, a mask image is generated by determining the specific color on the image. A CG image is masked with the mask image not to render the CG image in the region where the physical object should be displayed. For example, if overlap of a hand poses a problem, a mask image can be generated by determining a flesh color region in the physical space image (FIG. 9 of non-patent reference 3). In this case, however, a physical object that should be placed behind a virtual object is displayed on the near side. In addition, all physical objects of the same color are displayed in front of a virtual object.

The problem of overlap of a virtual object and a physical object can be solved by the following method. A position and orientation sensor is attached to a physical object (e.g., observer's hand). A virtual object that simulates the shape of the physical object is arranged in accordance with a position and orientation measured by the position and orientation sensor and superimposed on the physical object. Both the objects are CG images and are therefore displayed in a correct depth relationship.

When the hand 203 of the observer is arranged in front of the virtual object 202, as shown in FIG. 2A, using the above-described arrangement, a virtual object 206 that simulates the hand 203 is arranged at the position of the hand 203 in the image displayed on the HMD 201, as shown in FIG. 2C. The virtual object 206 is located in front of the virtual object 202. The position and orientation of the virtual object 206 changes based on the measured value of the position and orientation sensor attached to the hand of the observer 200. FIG. 2C is a view showing an example of the image in which the virtual object 206 that simulates the hand 203 is arranged at the position of the hand 203.

[Non-patent reference 1] Hiroyuki Yamamoto, "Mixed Reality: A New World Seen at the Boarder between Real and Virtual Worlds", information processing, vol. 43, no. 3, pp. 213-216, 2002.

[Non-patent reference 2] D. Kotake, K. Satoh, S. Uchiyama, and H. Yamamoto, "A hybrid and linear registration method utilizing inclination constraint", Proc. 4th IEEE/ACM Int'l Symp. on Mixed and Augmented Reality (ISMAR 2005), pp. 140-149, October 2005.

[Non-patent reference 3] Oshima, Yamamoto, and Tamura, "A Mixed Reality System with Visual and Tangible Interface Capability—Application to Evaluating Automobile Interior Design", Transactions of the Virtual Reality Society of Japan, vol. 9, no. 1, pp. 79-88, 2004.

[Patent reference 1] Japanese Patent Laid-Open No. 2000-353248

A physical object and a virtual object that simulates it do not have completely matching shapes and positional relationship. Hence, as shown in FIG. 3, a hand 180 as a physical object and a virtual object 310 are not displayed in a completely superimposed state (they appear to have a shift).

Assume that when a virtual object 702 that expresses the interior of a physical object 701 is superimposed on the physical object 701 and presented to an observer as a stereoscopic vision, as shown in FIG. 7, fusion by the observer occurs with focus on the virtual object 702. In this case, fusion may also occur on the surface of the external physical object 701.

Conventionally, when the interior of the object is visible in the physical space, the surface of the physical object 701 on the near side should be invisible or should be perceived as a semitransparent object. However, the fusible virtual object 702 exists behind the physical object 701 that is perceived as a completely opaque object. For this reason, the observer's binocular function is going to simultaneously fuse the cubic edge of the virtual object 702 on the far side and that of the physical object 701 on the near side. This phenomenon gives unnatural binocular rivalry to the observer and produces a sense of incongruity.

This will be explained using a detailed example.

FIG. 8 is a view showing an example of an image that superimposes a virtual object of an internal structure on the mock-up of the camera in FIG. 5 described in non-patent reference 2.

An image 801 is obtained by superimposing a virtual object of the internal structure of a camera on the mock-up of the camera shown in FIG. 5. An image 802 is an enlarged view in a frame 899. In the image 802, an edge 804 near the shutter of the mock-up that is a physical object is located close to an edge 803 of a gray component on the far side. However, when these objects having different depths are presented in a stereoscopic vision, the observer may have the above-described sense of incongruity.

SUMMARY OF THE INVENTION

The present invention has been made in consideration of the above-described problems, and has as its object to provide a technique of reducing various senses of incongruity generated upon superimposing a physical object and a virtual object.

According to one aspect of the present invention, an image processing apparatus comprises:

an unit adapted to acquire a position and orientation of a user's viewpoint;

an unit adapted to acquire a position and orientation of a physical object of interest;

an unit adapted to acquire an image of physical space including the physical object of interest;

a decision unit adapted to decide a region of the physical object of interest in the image of the physical space;

a processing unit adapted to perform blurring processing of an inclusion region including the decided region;

an unit adapted to arrange a virtual object in virtual space at the position and orientation of the physical object of interest;

an unit adapted to generate an image of the virtual space based on the position and orientation of the viewpoint;

an unit adapted to generate a composite image by superimposing the image of the virtual space on the image of the physical space that has undergone the blurring processing; and an unit adapted to output the composite image.

According to another aspect of the present invention, an image processing method comprises:

a step of acquiring a position and orientation of a user's viewpoint;

a step of acquiring a position and orientation of a physical object of interest;

a step of acquiring an image of physical space including the physical object of interest;

a decision step of deciding a region of the physical object of interest in the image of the physical space;

a processing step of performing blurring processing of an inclusion region including the decided region;

a step of arranging a virtual object in virtual space at the position and orientation of the physical object of interest;

a step of generating an image of the virtual space based on the position and orientation of the viewpoint;

a step of generating a composite image by superimposing the image of the virtual space on the image of the physical space that has undergone the blurring processing; and a step of outputting the composite image.

Further features of the present invention will become apparent from the following description of exemplary embodiments with reference to the attached drawings.

BRIEF DESCRIPTION OF THE DRAWINGS

FIG. 14 is a view showing a projection region and a manipulation region.

DESCRIPTION OF THE EMBODIMENTS

The preferred embodiments of the present invention will now be described in detail with reference to the accompanying drawings. Note that the embodiments will be described as examples of preferred arrangements of the present invention described in claims, and the present invention is not limited to the embodiments to be described below.

First Embodiment

Figure 1:
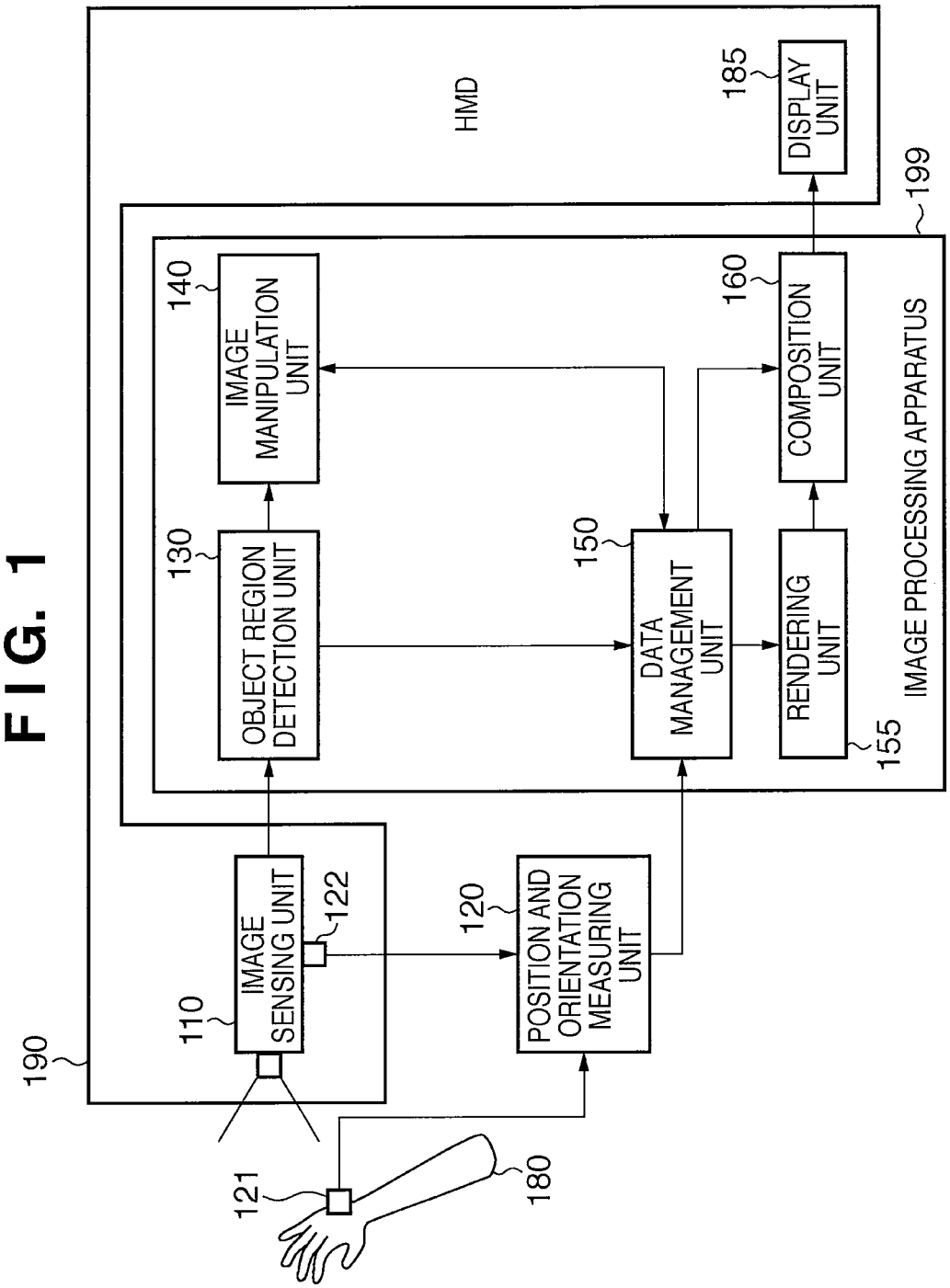
FIG. 1 is a block diagram showing the functional arrangement of a system according to the first embodiment of the present invention.
Figure 2A:
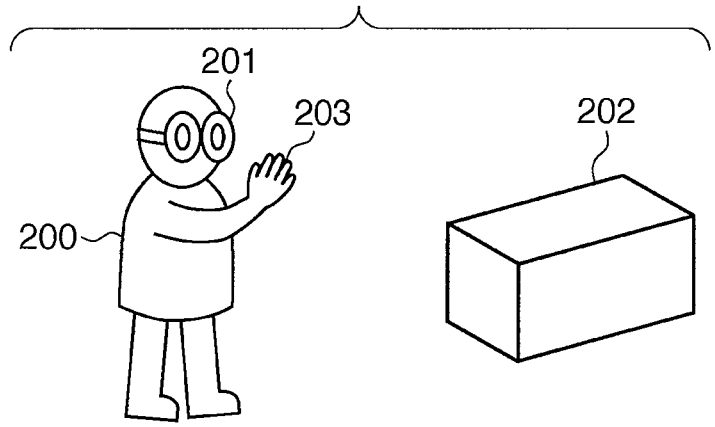
FIG. 2A is a view showing an observer who wears an HMD on the head, and a virtual object observed by the observer.
Figure 2B:
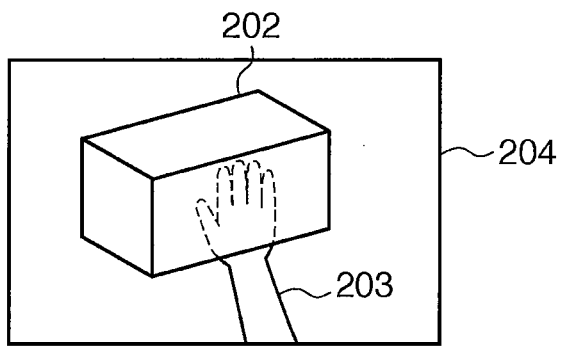
FIG. 2B is a view showing an example of an image displayed on an HMD 201 when an observer 200 observes a virtual object 202 while putting his/her hand 203 in the field of vision.
Figure 2C:
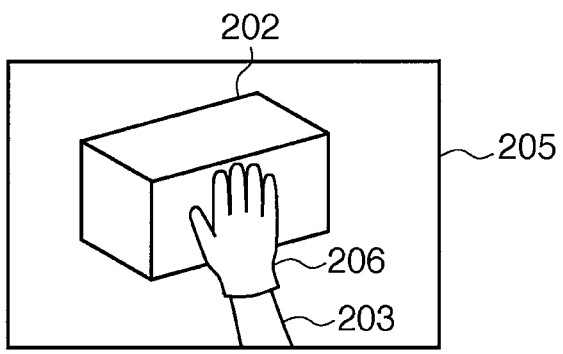
FIG. 2C is a view showing an example of an image in which a virtual object 206 that simulates the hand 203 is arranged at the position of the hand 203.

FIG. 1 is a block diagram showing the functional arrangement of a system according to this embodiment. As shown in FIG. 1, the system according to this embodiment includes an HMD 190, position and orientation measuring unit 120, and image processing apparatus 199.

The HMD 190 will be described.

The HMD 190 includes an image sensing unit 110 and a display unit 185.

The image sensing unit 110 senses a movie of physical space. Each sensed frame image (physical space image) is input to the image processing apparatus 199. In this embodiment, the image sensing unit 110 includes image sensing units corresponding to the right and left eyes of the observer (user) who wears the HMD 190 on the head. However, the two eyes may share one image sensing unit.

A sensor 122 for measuring the position and orientation of the image sensing unit 110 is attached to the image sensing unit. A sensor 121 similar to the sensor 122 is attached to a hand 180 (physical object of interest) of the user who wears the HMD 190 on the head. The sensors 121 and 122 will be described later.

The display unit 185 includes a liquid crystal panel and displays an image output from the image processing apparatus 199. The display unit 185 is attached to the HMD 190 so as to be located in front of the eyes of the user who wears the HMD 190 on the head.

The position and orientation measuring unit 120 will be described next.

The position and orientation measuring unit 120 measures the position and orientation of each of the above-described sensors 121 and 122. The position and orientation measuring unit 120 and the sensors 121 and 122 will be referred to as a sensor system overall. In this embodiment, the sensor system uses FASTRAK (magnetic sensor) available from Polhemus. In this case, the position and orientation measuring unit 120 measures the position and orientation of each of the sensors 121 and 122 by the following operation.

A magnetic field generation source is arranged at a predetermined position in physical space. Each of the sensors 121 and 122 detects a change in magnetism according to its position and orientation in a magnetic field generated by the source. Each of the sensors 121 and 122 sends a signal representing the detection result to the position and orientation measuring unit 120. Upon receiving the signal representing the detection result from the sensor 121, the position and orientation measuring unit 120 obtains, based on the signal, the position and orientation of the sensor 121 on the sensor coordinate system. The sensor coordinate system has its origin at the position of the generation source. Three axes perpendicularly intersecting each other at the origin are defined as the x-, y-, and z-axes. Similarly, upon receiving the signal representing the detection result from the sensor 122, the position and orientation measuring unit 120 obtains, based on the signal, the position and orientation of the sensor 122 on the sensor coordinate system.

This embodiment will be described assuming that the sensor coordinate system matches the world coordinate system. However, the coordinate systems need not always match. If the position and orientation relationship between them is known, position and orientation information in one coordinate system can be converted into position and orientation information in the other coordinate system using the position and orientation relationship. The world coordinate system has its origin at a predetermined point in physical space. Three axes perpendicularly intersecting each other at the origin are defined as the x-, y-, and z-axes.

The position and orientation measuring unit 120 outputs position and orientation information representing the obtained position and orientation to the image processing apparatus 199.

The image processing apparatus 199 will be described next. The image processing apparatus 199 includes an object region detection unit 130, image manipulation unit 140, data management unit 150, rendering unit 155, and composition unit 160.

Upon receiving the physical space image from the image sensing unit 110, the object region detection unit 130 detects the region of the hand 180 in the physical space image. The technique of detecting the region of the hand 180 is known. For example, the technique disclosed in non-patent reference 3 is used. That is, a flesh color region in the physical space image is detected.

The image manipulation unit 140 executes shading processing for an inclusion region that includes the region detected by the object region detection unit 130 in the physical space image input from the image sensing unit 110 to the object region detection unit 130. The shading processing is done using, for example, a Gaussian filter. The shading processing is a known technique, and a description thereof will be omitted here. Parameters for the shading processing, such as a window size to be set in the filter, are set in advance.

The physical space image in which the inclusion region including the region of the hand 180 is shaded by the image manipulation unit 140 is sent to the data management unit 150 and managed.

The data management unit 150 manages a parameter group necessary for creating the composite image of a physical space image and a virtual space image and also manages the physical space image output from the image manipulation unit 140. The data management unit 150 also manages the position and orientation information of the sensors 121 and 122 output from the position and orientation measuring unit 120.

The parameter group managed by the data management unit 150 includes the following parameters.

The intrinsic parameters of the image sensing unit 110 (focal length, image center, and the like)

The data of a virtual object that simulates the hand 180 (geometrical data, texture data, and the like)

The data managed by the data management unit 150 can be changed as needed in accordance with the system configuration and application purpose.

The rendering unit 155 forms virtual space using the virtual object data managed by the data management unit 150. In this embodiment, the processing of forming virtual space includes at least processing of arranging the virtual object that simulates the hand 180 at the position and orientation of the sensor 121.

The rendering unit 155 also adds "position and orientation relationship information representing the position and orientation relationship between the sensor 122 and the focal point (user's viewpoint) of the image sensing unit 110" measured in advance to the position and orientation of the sensor 122, thereby obtaining the position and orientation information of the user's viewpoint.

An image of the virtual space formed by the above processing and viewed from the position and orientation represented by the position and orientation information of the user's viewpoint is generated as a virtual space image. This processing is executed for each of the right and left eyes, as a matter of course.

The composition unit 160 generates a composite image by compositing the "physical space image in which the inclusion region including the region of the hand 180 is shaded", which is managed by the data management unit 150, with the virtual space image generated by the rendering unit 155, and outputs the generated composite image to the display unit 185 of the HMD 190.

With the above processing, the composite image generated by the composition unit 160 is displayed in front of the eyes of the user who wears the HMD 190 on the head.

Figure 11:
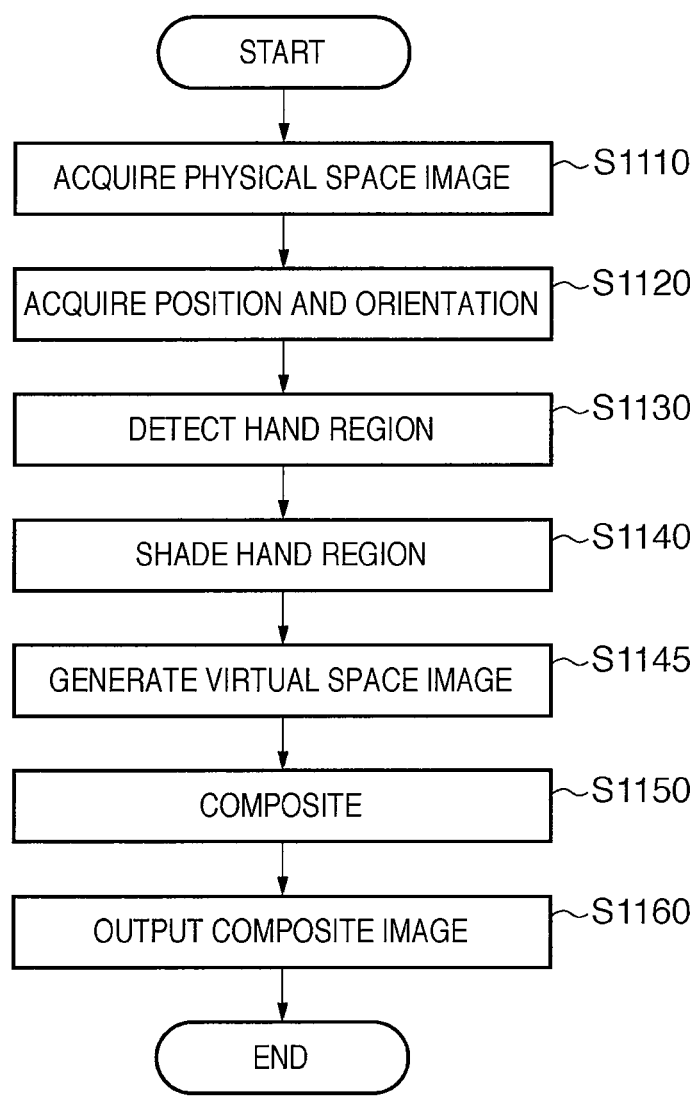
FIG. 11 is a flowchart of processing of causing the image processing apparatus 199 to output, to an HMD 190, a composite image obtained by compositing a virtual space image with a physical space image in which an inclusion region including the region of a hand 180 is shaded.

FIG. 11 is a flowchart of processing of causing the image processing apparatus 199 to output, to the HMD 190, a composite image obtained by compositing a virtual space image with a physical space image in which an inclusion region including the region of the hand 180 is shaded. The flowchart in FIG. 11 shows processing of generating a composite image of one frame and outputting it to the HMD 190. The image processing apparatus 199 repeatedly executes the processing of the flowchart shown in FIG. 11, thereby outputting a composite image of a plurality of continuous frames to the HMD 190.

In step S1110, the object region detection unit 130 acquires a physical space image sensed by the image sensing unit 110.

In step S1120, the data management unit 150 acquires the position and orientation information of the sensors 121 and 122 output from the position and orientation measuring unit 120.

In step S1130, the object region detection unit 130 detects the region of the hand 180 in the physical space image acquired from the image sensing unit 110.

In step S1140, the image manipulation unit 140 performs shading processing of an inclusion region including the region detected by the object region detection unit 130. The size of the inclusion region is not particularly limited. The size of the region of the hand 180 is assumed to be the same as that of the inclusion region for the descriptive convenience.

In step S1145, the rendering unit 155 generates viewpoint position and orientation information by adding the position and orientation relationship information to the position and orientation information of the sensor 122. Then, the rendering unit 155 arranges the virtual object that simulates the hand 180 at the position and orientation of the sensor 121. The rendering unit 155 generates, as a virtual space image, an image of the virtual space including the virtual object and viewed from the position and orientation represented by the viewpoint position and orientation information.

In step S1150, the composition unit 160 generates a composite image by compositing the physical space image (which has undergone the shading processing) in which the inclusion region is shaded by the process in step S1140 with the virtual space image generated in step S1145.

In step S1160, the composition unit 160 outputs the composite image generated in step S1150 to the HMD 190.

An effect obtained by the above-described processing will be described with reference to FIGS. 3 and 4.

Figure 3:
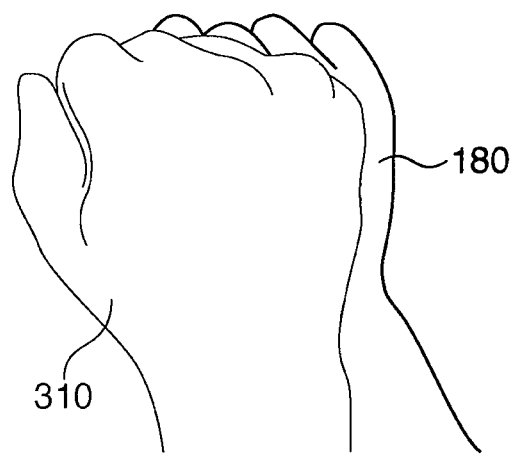
FIG. 3 is a view showing an example of an image displayed by compositing a hand with a virtual object that simulates the hand by a conventional technique.

FIG. 3 is a view showing an example of an image displayed by compositing a hand with a virtual object that simulates the hand by a conventional technique. As shown in FIG. 3, when a virtual object 310 that simulates the hand 180 is to be arranged at the position and orientation of the hand 180, the virtual object 310 may be displayed at a position shifted from the hand 180. If the region of the hand 180 in the physical space image is directly displayed, the shift is noticeable.

Figure 4:
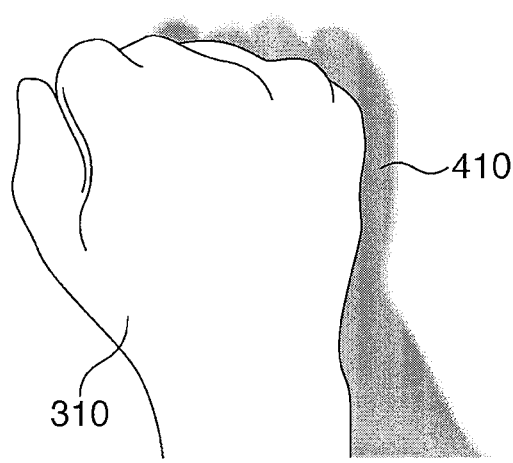
FIG. 4 is a view showing an example of a composite image obtained by processing according to the flowchart in FIG. 11.

FIG. 4 is a view showing an example of a composite image obtained by the processing according to the flowchart in FIG. 11. As shown in FIG. 4, the inclusion region including the region of the hand 180 shown in FIG. 3 is shaded to generate a region 410. Since the user who observes the image can concentrate attention on the virtual object 310, his/her awareness of the shift is suppressed.

Shading the hand region on the image reduces the sense of shift between user's feeling about his/her hand and the virtual object that simulates the hand.

First Modification of First Embodiment

In the first embodiment, the technique of detecting a flesh color region is used to detect the hand region in the physical space image. However, the hand region may be detected by another method. The region to be detected is not limited to the hand region. Any other target region may be detected as needed.

Figure 5:
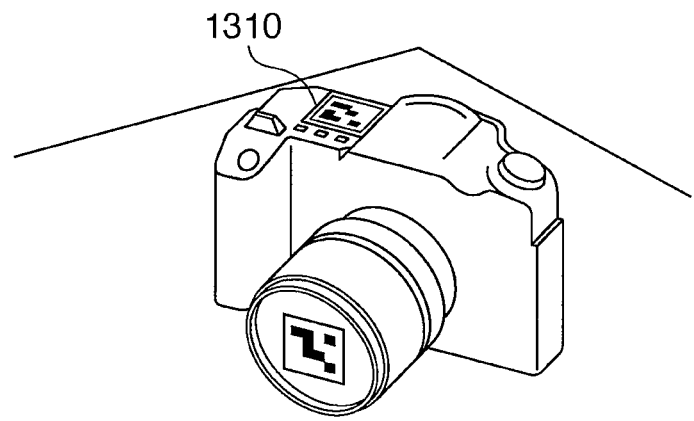
FIG. 5 is a view for explaining a mock-up 1310 of a camera.
Figure 6:
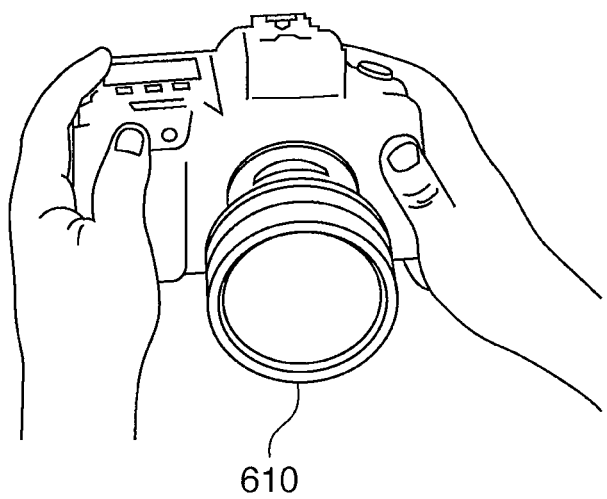
FIG. 6 is a view for explaining a virtual object 610 of a camera.
Figure 7:
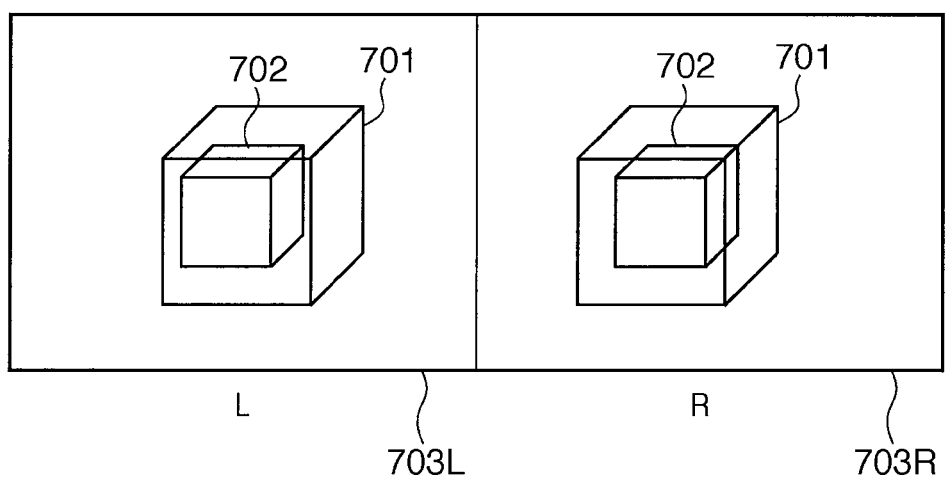
FIG. 7 is a view showing a state in which a virtual object 702 expressing the interior of a physical object 701 is superimposed on the physical object 701.

For example, when a shift is generated by superimposing a virtual object 610 of a camera generated by CAD shown in FIG. 6 on a mock-up 1310 of a camera shown in FIG. 5, the region of the mock-up 1310 on the image may be shaded. This reduces the user's sense of shift. In the following example, assume that the region of the mock-up 1310 exists in the periphery of the virtual object 610. The peripheral region of the virtual object 610 projected onto the image is shaded, thereby reducing the sense of shift.

In this modification, the mock-up region in the physical space image is shaded. The remaining processes are the same as in the first embodiment. The actual processing does not change even when a region of the physical object except the mock-up is to be shaded.

Figure 13:
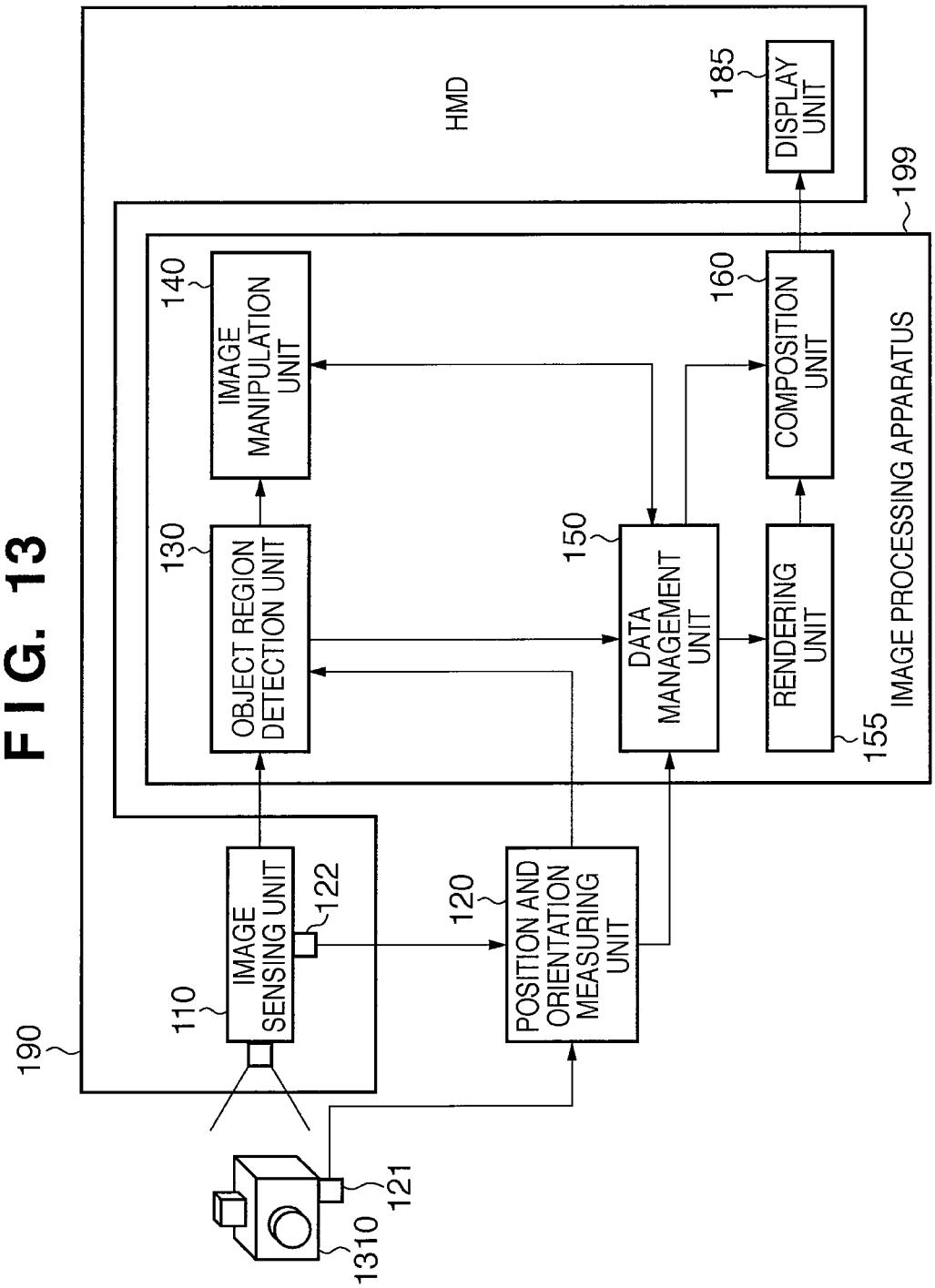
FIG. 13 is a block diagram showing the functional arrangement of a system according to the first modification of the first embodiment of the present invention.

FIG. 13 is a block diagram showing the functional arrangement of a system according to this modification. The same reference numerals as in FIG. 1 denote the same parts in FIG. 13, and a description thereof will not be repeated.

The system of this modification is different from that of the first embodiment in that the sensor 121 is attached not to the hand but to the mock-up 1310.

Processing of detecting the region of the mock-up in the physical space image, shading an inclusion region including the region of the mock-up, and compositing a virtual object with the physical space image that has undergone the shading processing will be described.

In this modification as well, the processing according to the flowchart in FIG. 11 is performed. The process in step S1130 is replaced with the following process.

Figure 12:
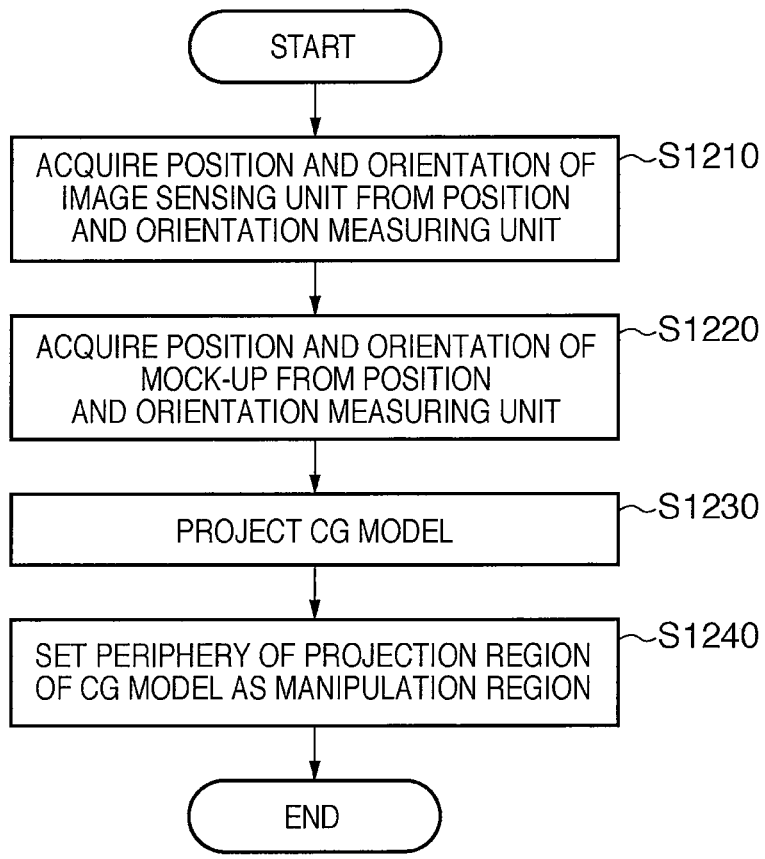
FIG. 12 is a flowchart of processing of determining a "shading target region" according to the first modification of the first embodiment of the present invention.

FIG. 12 is a flowchart of processing of determining a "shading target region" according to this modification. In other words, the processing of the flowchart in FIG. 12 indicates details of the process in step S1130 of FIG. 11.

In step S1210, the object region detection unit 130 acquires, from the data management unit 150, the position and orientation information of the sensor 122, which has been acquired by the data management unit 150 from the position and orientation measuring unit 120.

In step S1220, the object region detection unit 130 acquires, from the data management unit 150, the position and orientation information of the sensor 121, which has been acquired by the data management unit 150 from the position and orientation measuring unit 120.

In step S1230, the object region detection unit 130 arranges a virtual object that simulates a camera at the position and orientation represented by the position and orientation information acquired in step S1220. Then, the region of the virtual object on a known projection plane to be used to generate a virtual space image is obtained. That is, a region (projection region) in which the virtual object is projected onto the projection plane by a known perspective projection operation is obtained. In this projection, the virtual object is not rendered on the projection plane. For example, the projection region can be decided in the following way. Referring to depth values on a coordinate system based on the viewpoint in the virtual space, a region where the depth values of the respective pixels, which were initialized before the projection, have changed is determined as the projection region.

In step S1240, the object region detection unit 130 obtains, as a manipulation region, a region obtained by expanding the projection region based on a preset region expansion amount E.

FIG. 14 is a view showing the projection region and the manipulation region. Referring to FIG. 14, reference numeral 1430 denotes a projection plane; 1410, a projection region of the virtual object projected onto the projection plane; and 1420, a manipulation region obtained by expanding the projection region 1410.

For the region expansion amount, an amount of "shift" (the unit is, e.g., "pixel") between the physical object and the virtual object is predicted in advance on the image. A value larger than the shift pixel amount is preferably set as the region expansion amount E.

From step S1140 in FIG. 11, a region in the physical space image, whose position corresponds to that of the manipulation region, is determined as the shading target.

Second Modification of First Embodiment

In the first modification, the manipulation region is set by expanding the projection region by the expansion amount designated in advance. However, the present invention is not limited to setting the manipulation region. For example, if the target object cannot fit in the manipulation region of the first modification, a region may be added to the manipulation region using color information around the manipulation region.

For example, the sensed image is labeled by a designated color in advance. If the labeled region is adjacent to the manipulation region obtained by the object region detection unit 130 in step S1240, the adjacent labeled region is added to the manipulation region. The color of the target object is designated for labeling. For, for example, the mock-up shown in FIG. 5, the mock-up is sensed in advance, and color information in the region of the mock-up is registered. The color of the mock-up is preferably discriminable from the color of background at the time of experience.

Second Embodiment

In the first embodiment and its first and second modifications, a target region in a physical space image is shaded aiming at reducing the sense of shift between a physical object and a virtual object. In the second embodiment, a sense of incongruity in a binocular stereoscopic vision which is generated upon superimposing a virtual object expressing the interior of a physical object on the physical object (rendering a stereoscopic CG image) is reduced.

Figure 8:
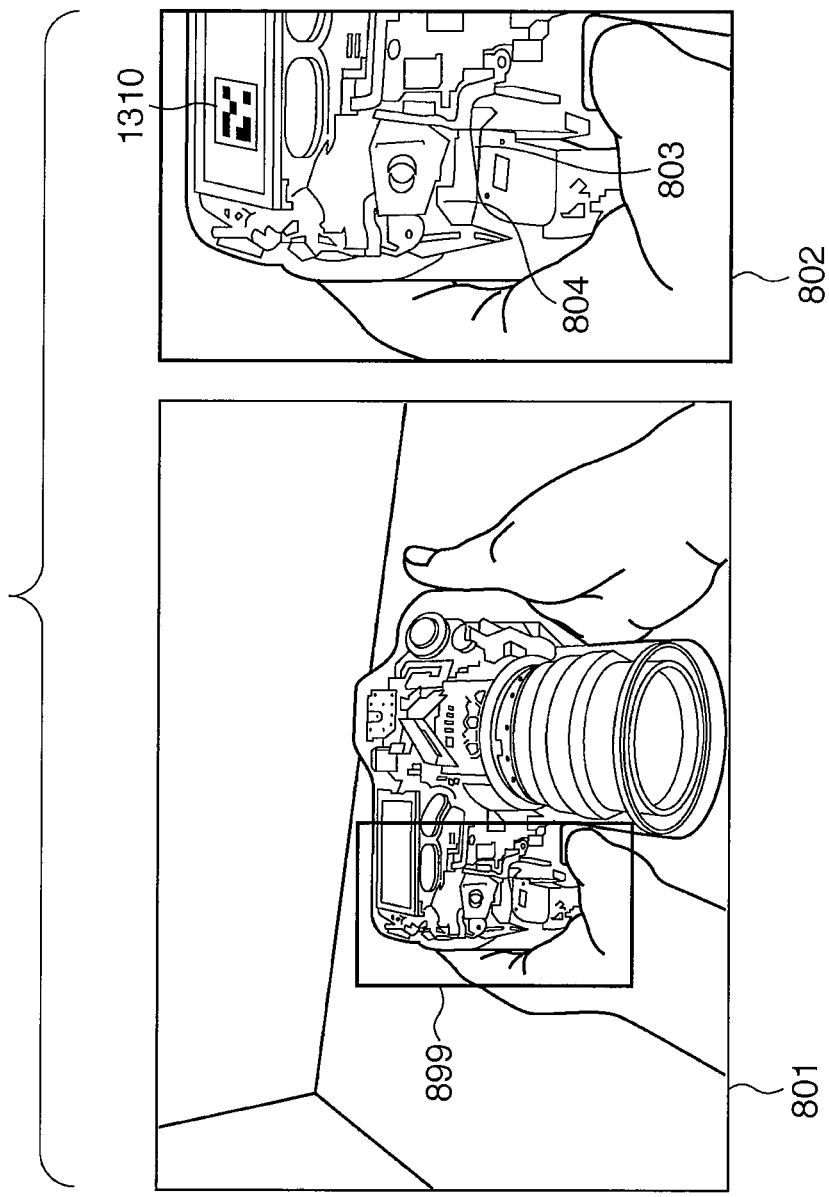
FIG. 8 is a view showing an example of an image that superimposes a virtual object of an internal structure on the mock-up of the camera in FIG. 5 described in non-patent reference 2.

In this embodiment, when a stereoscopic vision is presented by superimposing an internal structure virtual object shown in FIG. 8 on a mock-up 1310 shown in FIG. 5, the region in a virtual object 610 representing a camera exterior shown in FIG. 6 is shaded to reduce the sense of incongruity in the binocular stereoscopic vision.

More specifically, the virtual object 610 representing a camera exterior is arranged at the position and orientation of the mock-up 1310. After that (after arrangement), the projection region of the virtual object 610 is obtained, and the projection region on the physical space image is shaded. On the other hand, the internal structure virtual object is arranged at the position and orientation of the mock-up 1310. Then, an image of the internal structure virtual object viewed from the viewpoint is generated as a virtual space image. The physical space image and the virtual space image are composited. That is, the internal structure virtual object is displayed in the shaded region on the physical space image.

The system of this embodiment uses the arrangement of the first modification, that is, the arrangement shown in FIG. 13. However, a data management unit 150 also manages the data of the internal structure virtual object and the data of the virtual object 610 representing the camera exterior.

In this embodiment as well, the processing according to the flowchart in FIG. 11 is performed. The process in step S1130 is replaced with the following process.

In step S1130 of FIG. 11, the projection region obtained in step S1230 of the flowchart in FIG. 12 is defined as the manipulation region without executing the expanding processing in step S1240.

In step S1145, a rendering unit 155 generates viewpoint position and orientation information by adding position and orientation relationship information to the position and orientation information of a sensor 122. Next, the rendering unit 155 arranges the internal structure virtual object at the position and orientation of a sensor 121. The rendering unit 155 generates, as a virtual space image, an image of the virtual space including the internal structure virtual object and viewed from the position and orientation represented by the viewpoint position and orientation information.

Figure 9:
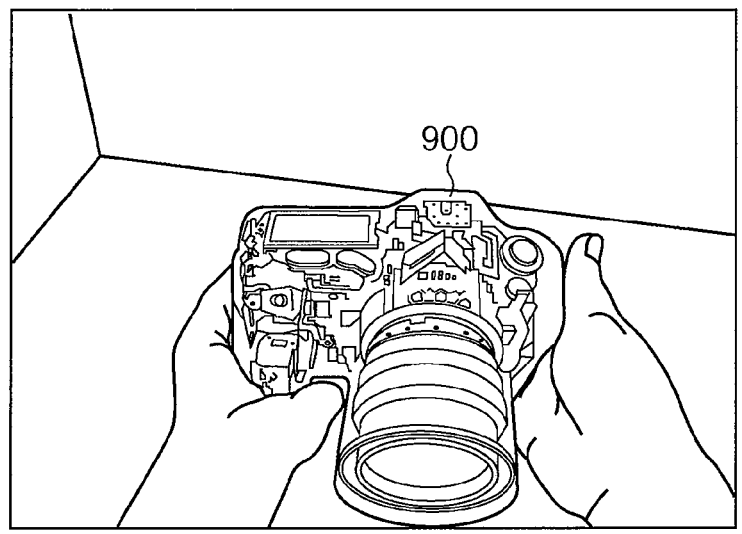
FIG. 9 is a view showing a state in which a region 900 in the mock-up 1310 is shaded.

The effect of this embodiment will be explained next using a detailed example. Like an image 801 shown in FIG. 8, the region of the mock-up 1310 is clearly displayed. In a binocular stereoscopic vision, the user feels a sense of incongruity because of a visual function of simultaneously fusing the object on the near side and that on the far side. In this embodiment, however, a region 900 inside the mock-up 1310 is shaded, as shown in FIG. 9. This makes it difficult for the user to fuse an edge near an edge 803 shown in FIG. 8 and perceive the object as a completely opaque object. That is, the visual function of simultaneously fusing the object on the near side and that on the far side can be disabled at high probability, and an effect of contributing to reduction of the sense of incongruity is obtained.

First Modification of Second Embodiment

In the second embodiment, the projection region is set as the region to be shaded. If masking of a hand is necessary, as shown in FIG. 9 of non-patent reference 3, "shading processing" should sometimes be inhibited for the hand region included in the shading target region.

To cope with this situation, an object region detection unit 130 can inhibit "shading processing" of the hand region by excluding a portion corresponding to a flesh color region from the manipulation region in step S1240. That is, a region except the flesh color region in the manipulation region is set as the final manipulation region. It is also possible to exclude, from the manipulation region, a portion corresponding to a region of another color, as a matter of course.

Second Modification of Second Embodiment

In this modification, the color of the shaded region is changed as needed.

For example, in the first modification of the second embodiment, the region 900 in FIG. 9 is shaded without changing the color of the sensed image. However, when the virtual object is enhanced by further tinting the shaded region with the complementary color of the internal structure virtual object, the sense of shift can be reduced.

The system of this modification uses the arrangement shown in FIG. 13. However, the data management unit 150 also manages data of a color to be assigned to the shaded region.

As the color to be managed by the data management unit 150, the complementary color of color components contained most in the color information of the internal structure virtual object may be set.

As another method, the pixel colors of the outer periphery of the internal structure virtual object are predicted upon causing the rendering unit 155 to render the internal structure virtual object by projecting it on the projection plane. Then, the complementary color of color components contained most may be set. For example, if blue components are contained most in the pixel colors of the outer periphery of the virtual object, the complementary color, that is, yellow is set in the data management unit 150. More specifically, when the target color is expressed by R, G, and B components, and each color component is expressed by 8-bit data (pixel value=0 to 255), a value obtained by subtracting each of the R, G, and B values of the target color from 255 is set as the complementary color of the target color.

In this modification as well, the same processing as in the second embodiment is performed. However, processing of changing the color of the shaded region to the color managed by the data management unit 150 is added in step S1240. In changing the color, for example, the color of the shaded region is converted into the grayscale, and the complementary color of the virtual object is added to the converted value, thereby obtaining the final pixel value.

As described above, instead of simply shading the region, the color of the shaded region is changed to make the observer concentrate on the virtual object. This enables reduction of the sense of shift.

The above-described embodiments (including the modifications) can be combined as needed.

Third Embodiment

In the first and second embodiments (including the modifications), the units included in the image processing apparatus 199 shown in FIG. 1 or 13 are formed from hardware. However, they may be formed from software. In this case, for example, a general PC (personal computer) is applied to an image processing apparatus 199. It is possible to make the computer execute the processing described in the first and second embodiments (including the modifications) by storing software in the memory of the computer and causing the CPU of the computer to execute the software.

Figure 10:
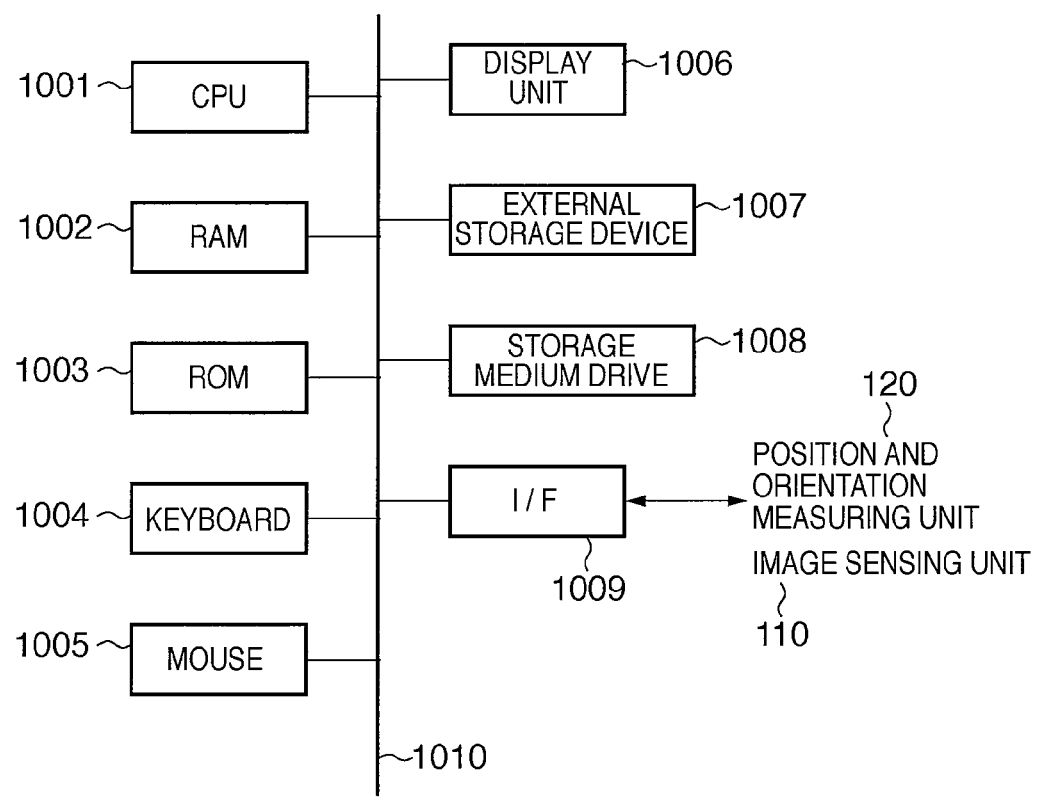
FIG. 10 is a block diagram showing the hardware configuration of a computer applicable to an image processing apparatus 199.

FIG. 10 is a block diagram showing the hardware configuration of the computer applicable to the image processing apparatus 199.

A CPU 1001 controls the entire computer using programs and data stored in a RAM 1002 and a ROM 1003 and also executes the above-described processing of the image processing apparatus 199.

The RAM 1002 has an area to temporarily store programs and data loaded from an external storage device 1007 or a storage medium drive 1008. The RAM 1002 also has an area to temporarily store position and orientation information or a physical space image output from a position and orientation measuring unit 120 or an image sensing unit 110 via an I/F (interface) 1009. The RAM 1002 also has a work area to be used by the CPU 1001 to execute various kinds of processing. That is, the RAM 1002 can provide various areas as needed.

The ROM 1003 stores the set data and boot program of the computer.

A keyboard 1004 and a mouse 1005 function as examples of a pointing device. The operator of the computer can input various instructions to the CPU 1001 by operating the keyboard or mouse.

A display unit 1006 including a CRT or a liquid crystal panel can display the processing result of the CPU 1001 as an image or a text.

The external storage device 1007 is a mass information storage device represented by a hard disk drive. The external storage device 1007 stores the OS (Operating System), and programs and data which cause the CPU 1001 to execute the above-described processing of the image processing apparatus 199. The programs include a program for causing the CPU 1001 to implement functions corresponding to an object region detection unit 130, image manipulation unit 140, data management unit 150, rendering unit 155, and composition unit 160 shown in FIG. 1. The data include the above-described various kinds of data managed by the data management unit 150, and various kinds of data described as known data. The programs and data stored in the external storage device 1007 are loaded to the RAM 1002 as needed under the control of the CPU 1001 and processed by it.

The storage medium drive 1008 reads out information recorded on a storage medium such as a CD-ROM or a DVD-ROM and outputs the readout information to the RAM 1002 or the external storage device 1007. The information described as that stored in the external storage device 1007 may partially be recorded on the storage medium.

The I/F 1009 is formed from an analog video port to be connected to the image sensing unit 110, a digital input/output port such as IEEE1394, a serial port such as RS-232C or USB, or an Ethernet® port to be connected to the position and orientation measuring unit 120.

A bus 1010 connects the above-described units.

Other Embodiments

The object of the present invention is also achieved by the following method. A recording medium (storage medium) which records software program codes to implement the functions of the above-described embodiments is supplied to a system or apparatus. The storage medium is a computer-readable storage medium, as a matter of course. The computer (or CPU or MPU) of the system or apparatus reads out and executes the program codes stored in the recording medium. In this case, the program codes read out from the recording medium themselves implement the functions of the above-described embodiments. The recording medium that stores the program codes constitutes the present invention.

The functions of the above-described embodiments are also implemented when the computer executes the readout program codes, and the operating system (OS) running on the computer partially or wholly executes actual processing based on the instructions of the program codes.

Assume that the program codes read out from the recording medium are written in the memory of a function expansion card inserted into the computer or a function expansion unit connected to the computer. The CPU of the function expansion card or function expansion unit partially or wholly executes actual processing based on the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-273093, filed Oct. 19, 2007 which is hereby incorporated by reference herein in its entirety.

What is claimed is:

1. An image processing apparatus comprising:
   an unit adapted to acquire a position and orientation of a user's viewpoint;
   an unit adapted to acquire a position and orientation of a physical object of interest;
   an unit adapted to acquire an image of physical space including the physical object of interest;
   a decision unit adapted to decide a region of the physical object of interest in the image of the physical space;
   an unit adapted to arrange a virtual object in virtual space at the position and orientation of the physical object of interest;
   an unit adapted to generate an image of the virtual space based on the position and orientation of the user's viewpoint;
   a determination unit adapted to determine an area of a region to be blurred based on an amount of shift between the physical object of interest and the virtual object in the virtual space;
   a blurring unit adapted to blur the region to be blurred in the image of the physical space, wherein the region to be blurred in the image of the physical space is determined based on the determination area of the region;
   a generation unit adapted to generate a composite image by superimposing the image of the virtual space on the physical object of interest in the image of the physical space that has undergone the blurring processing; and
   an unit adapted to output the composite image.

2. The apparatus according to claim 1, wherein said decision unit decides the region of the physical object of interest outside a region having a predetermined color in the image of the physical space.

3. The apparatus according to claim 1, wherein said decision unit decides a flesh color region in the image of the physical space.

4. The apparatus according to claim 1, wherein
   said decision unit arranges the virtual object in the virtual space at the position and orientation of the physical object of interest and decides a region on a projection plane of the arranged virtual object, and
   an inclusion region is a region obtained by expanding the decided region at a predetermined ratio.

5. The apparatus according to claim 1, further comprising an unit adapted to change a color of the region decided by said decision unit.

6. The apparatus according to claim 1, wherein the physical object of interest is a hand of the user.

7. The apparatus according to claim 1, wherein the physical object of interest is a mock-up.

8. The apparatus according to claim 1, wherein the virtual object has a shape obtained by simulating a shape of the physical object of interest.

9. The image processing apparatus according to claim 1, wherein the blurring unit is further adapted to perform filtering processing on the image of the physical space within the region to be blurred, in order to blur the image of the physical space.

10. The image processing apparatus according to claim 1, further comprising a correction unit adapted to determine a color to be used for correction based on a color of the virtual object, and to correct color within the region to be blurred in the image of the physical space using the determined color to be used for correction.

11. The image processing apparatus according to claim 1, wherein the blurring unit is further adapted to determine an expanded area to be blurred having a designated color and to blur the expanded area in the image of the physical space, wherein the expanded area to be blurred is around the region to be blurred in the image of the physical space, and wherein the designated color is determined based on the physical object.

12. The image processing apparatus according to claim 1, the generation unit is further configured to generate the composite image so as to occlude the physical object in the image of the physical space with the virtual object in the image of the virtual space, wherein substantial part of the physical object in the image of the physical space is made invisible due to the occlusion.

13. An image processing method comprising:
a step of acquiring a position and orientation of a user's viewpoint;
a step of acquiring a position and orientation of a physical object of interest;
a step of acquiring an image of physical space including the physical object of interest;
a decision step of deciding a region of the physical object of interest in the image of the physical space;
a step of arranging a virtual object in virtual space at the position and orientation of the physical object of interest;
a step of generating an image of the virtual space based on the position and orientation of the user's viewpoint;
a step of determining an area of a region to be blurred based on an amount of shift between the physical object of interest and the virtual object in the virtual space;
a step of blurring the region to be blurred in the image of the physical space, wherein the region to be blurred in the image of the physical space is determined, based on the determination area of the region;
a step of generating a composite image by superimposing the image of the virtual space on the physical object of interest in the image of the physical space that has undergone the blurring processing; and
a step of outputting the composite image.

14. A non-transitory computer-readable storage medium which stores a program to cause a computer to execute an image processing method of claim 13.

15. An image processing apparatus comprising:
an unit adapted to acquire a position and orientation of a user's viewpoint;
an unit adapted to acquire a position and orientation of a physical object of interest;
an unit adapted to acquire an image of physical space including the physical object of interest;
a decision unit adapted to decide a region of the physical object of interest in the image of the physical space;
an unit adapted to arrange a virtual object in virtual space at the position and orientation of the physical object of interest;
an unit adapted to generate an image of the virtual space based on the position and orientation of the user's viewpoint;
a blurring unit adapted to blur the image of the physical space, wherein a region to be blurred in the image of the physical space includes the region of the physical object of interest decided by the decision unit;
a generation unit adapted to generate a composite image by superimposing the image of the virtual space on the physical object of interest in the image of the physical space that has undergone the blurring processing; and
an unit adapted to output the composite image.

16. An image processing method comprising:
a step of acquiring a position and orientation of a user's viewpoint;
a step of acquiring a position and orientation of a physical object of interest;
a step of acquiring an image of physical space including the physical object of interest;
a step of deciding a region of the physical object of interest in the image of the physical space;
a step of arranging a virtual object in virtual space at the position and orientation of the physical object of interest;
a step of generating an image of the virtual space based on the position and orientation of the user's viewpoint;
a step of blurring the image of the physical space, wherein a region to be blurred in the image of the physical space includes the decided region of the physical object of interest;
a step of generating a composite image by superimposing the image of the virtual space on the physical object of interest in the image of the physical space that has undergone the blurring processing; and
a step of outputting the composite image.

17. A non-transitory computer-readable storage medium which stores a program to cause a computer to execute an image processing method of claim 16.

* * * * *